United States Patent [19]

Hyltin

[11] 4,001,664
[45] Jan. 4, 1977

[54] D.C. POTENTIAL MULTIPLIER
[75] Inventor: Tom M. Hyltin, Dallas, Tex.
[73] Assignee: Seiko Instruments Incorporated, Torrance, Calif.
[22] Filed: Mar. 3, 1975
[21] Appl. No.: 554,488
[52] U.S. Cl. .............................................. 321/15
[51] Int. Cl.² ................................... H02M 3/155
[58] Field of Search ............. 307/109, 110; 321/15

[56] References Cited
UNITED STATES PATENTS

| | | | |
|---|---|---|---|
| 3,432,738 | 3/1969 | Jensen | 307/110 X |
| 3,631,259 | 12/1971 | Kiyota | 321/15 X |
| 3,818,484 | 6/1974 | Nakamura et al. | 321/15 X |
| 3,824,447 | 7/1974 | Kuwabara | 307/110 X |
| 3,955,353 | 5/1976 | Astle | 321/15 X |

Primary Examiner—A. D. Pellinen
Attorney, Agent, or Firm—Brumbaugh, Graves, Donohue & Raymond

[57] ABSTRACT

A D.C. potential multiplier has a first capacitor which is time shared between two potential multiplying circuits. In the first multiplying circuit, gates connect the first capacitor for charging from a potential source. The gates then switch the capacitor into potential adding series with the source for charging a second capacitor toward the combined potential of the source and first capacitor. The gates next switch the first capacitor into the second multiplying circuit for charging the first capacitor from the second. The gates then switch the first and second capacitor into potential adding series for providing an output potential from the second potential multiplying circuit.

7 Claims, 1 Drawing Figure

U.S. Patent   Jan. 4, 1977   4,001,664
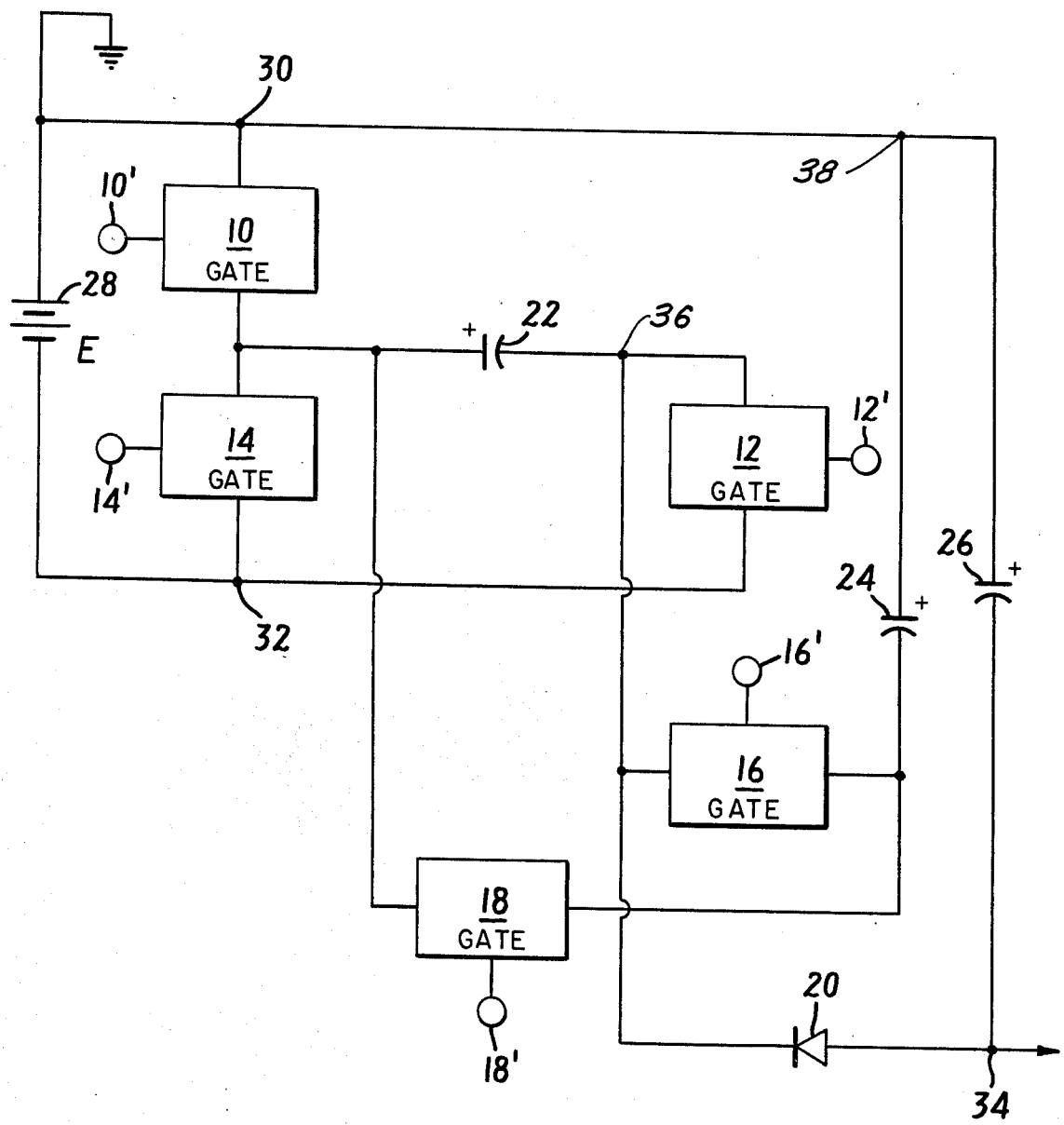

D.C. POTENTIAL MULTIPLIER

BACKGROUND OF THE INVENTION

Solid state electronic technology introduced an incredible reduction in the size of electronic devices. Integrated circuit technology now permits whole circuits to be placed on a thumb-nail size chip or wafer, and complex systems to be placed on a wafer only an inch or two in diameter. The small size of such integrated circuits promotes their use in many devices, especially in electronic watches.

Many electronic devices such as electronic watches also require displays for showing a function such as the time generated in the electronics. These display devices continue to require substantially greater electric power for their operation than is required for the operation of the integrated circuits.

Early displays required about 20 V.D.C. and over 1 microampere for their operation. Common power sources suitable for providing this high potential greatly exceeded the size of the integrated circuits and displays with which they were to be used and thereby encumbered the device in which the integrated circuit and display were incorporated; other suitable power sources were prohibitively expensive. To avoid these disadvantages, small electronic devices often included power sources providing a potential lower than that required by the display, but sufficient for the integrated circuitry, and electronic circuitry for multiplying the source potential to that required by the display. The prior art potential multipliers include both the transformer type of potential converter and the reactance type of converter. In both of these types, the size of the inductor and the number of auxiliary capacitors and bipolar transistors external to the integrated circuits causes the size and cost of the potential multiplying circuit to be excessive.

Other potential multiplying circuits for use in small electronic devices such as electronic watches are of the diode-capacitor network type. These networks are not practical because the potential drop across each diode is on the order of 0.5 to 0.7 V.D.C. while the available potential from a desirable power source such as a single dry cell is only about 1.5 V.D.C. While a higher potential power source would lessen the impractically high proportion of the source potential dropped across the diodes, such power sources are more expensive. Moreover, such circuits require a significant number of capacitors to which a corresponding number of connections from the integrated circuit must be made.

Therefore, it is desirable to minimize the number of capacitors required to be externally connected to the integrated circuit. Minimizing the number of capacitors also reduces the cost of the circuit. It is also desirable to minimize the number of other external connections required by the circuit.

SUMMARY OF THE INVENTION

It is therefore an object of the invention to provide a D.C. potential multiplier, suitable for providing power to a display of an electronic device such as an electronic watch, which may be included in an integrated circuit, has a low potential drop across the multiplier, and has a minimum number of connections to devices external to the integrated circuit.

To this end and in accordance with the present invention, the D.C. potential multiplier has a first capacitor which is time shared between two potential multiplying circuits, and means switchably connecting the potential multiplying circuits. The switching means first connect the first capacitor in a first multiplying circuit for charging from a potential source. The switching means then switch the capacitor into potential adding series with the source for charging a second capacitor of a second potential multiplying circuit toward the combined potential of the source and first capacitor. To time share the first capacitor, the switching means next connect the first capacitor into the second potential multiplying circuit for charging the first capacitor from the second. The switching means then connect the first and second capacitor in potential adding series for providing an output potential from the second potential multiplying circuit which is the combination of the potentials then on the capacitors.

Additional switching means in a preferred embodiment switch the output potential from the second potential multiplying circuit onto a third capacitor for use until the other switching means again switch the first and second capacitors for again providing the output potential. In this preferred embodiment the switching means are gates on an integrated circuit. The potential multiplier then requires connections from the integrated circuit to external components only for the capacitors, the potential source, and the output potential. Known gates which may be implemented on an integrated circuit have a maximum potential drop across each gate of only 0.1–0.2 V.D.C. to provide a large multiple of the source potential as the output potential.

DESCRIPTION OF THE DRAWING

The drawing contains a schematic diagram of one embodiment of a D.C. potential multiplier arranged according to the present invention.

DESCRIPTION OF THE PREFERRED EMBODIMENT

The schematic drawing shows five gates 10, 12, 14, 16 and 18 and a diode 20 which are formed on an integrated circuit. The gates are the switching means of the D.C. potential multiplier. The gates may be MOS devices, transmission gates, or common logic gates, each of which have a maximum potential drop across the gate of about 0.1–0.2 V.D.C. Each gate has a respective input control terminal or port 10', 12', 14', 16', and 18' for receiving switching signals from other devices (not shown) on the integrated circuit for enabling or disabling the corresponding gate.

Three capacitors 22, 24 and 26 are connected to the gates on the integrated circuit as shown in the drawing. A positive-grounded potential source 28 of potential E, for example a single 1.5 V. dry cell, is also connected across the gates on the integrated circuit at terminals 30, 32. A single output terminal 34 is formed on the integrated circuit for providing the output potential from the potential multiplier. The potential multiplier shown in the drawing then requires external connections only to the capacitors and terminals 30, 32, and 34. Since other devices (not shown) may also be provided on the integrated circuit, the terminals 30, 32 connected to the potential source may be common to these other devices for also providing power to them.

The present invention may be best understood by the following description of operation.

In the initial condition of the potential multiplier, the control ports 10' and 12' receive switching signals appropriate for enabling the corresponding gates 10, 12. Each other input 14', 16' and 18' receives a signal for disabling the gates 14, 16, and 18. Capacitor 22 is then connected across the potential source 28 for charging to approximately the potential, E, of the source. The capacitor 26 is also connected across the potential source 28 through the diode 20.

The actual potential on capacitor 22 is, of course the potential of the source 28 less the potential drop across the gates 10, 12. However, the potential drop across the gates at full current through the gates is relatively small compared to the potential of the source and, as the potential across the capacitor 22 rises, the current through the gates decreases to further reduce the potential drop across the gates. The potential on capacitor 22 accordingly closely approaches that of the source 28. For the same reasons, the potential drop across each of the other gates 14, 16, and 18 may also be neglected when these gates are enabled.

The switching signals to control ports 10', 12' then change to switch the corresponding gates 10, 12 to a disabled state and, simultaneously, the switching signals to control ports 14', 16' also change to switch the corresponding gates 14, 16 to an enabled state, the switching signal on the control port 18' remaining the same to keep the gate 18 disabled. Enabled gate 14 connects capacitor 22 in potential adding series with the potential source 28, and enabled gate 16 connects the potential adding series of capacitor 22 and potential source 28 across the capacitor 24 to increase the charge on capacitor 24 toward the combined potential of capacitor 22 and potential source 28, about 2E, the actual potential increase depending upon the ratio of the capacitances of the capacitors 22, 24. Gates 10, 12, 14 and 16 and capacitor 22 have thus functioned as a first potential multiplying circuit which provides two times the potential of the source 28 to capacitor 24.

Many integrated circuits for digital devices have relatively high frequency clock pulses within other circuits (not shown) on the integrated circuit. For example, an electronic watch may have clock pulses of about 1024 Hz. These clock pulses may be conveniently divided by 8 or 16 by means (not shown) which then provide clock pulses at about 154 Hz. or 77 Hz. These pulses may then provide the switching signals for the gate control ports 10', 12', 14' and 16'. Since the gates function in pairs, these pulses switch the gates at about 77 Hz. or 38 Hz.

It has been found that these frequencies substantially exceed the required rate at which the output potential must be provided to the output terminal 34 when the potential multiplier is used in an electronic watch. Therefore, the ratio of the capacitances of capacitors 22, 24 which determines the charge increase of capacitor 24 from the potential adding series of capacitor 22 and source 28 may be selected to only partly increase the potential on capacitor 24 to that of capacitor 22 and source 28, and the described operation of the first potential multiplying circuit repeated through several successive cycles of operation, for example about 10 successive cycles, to progressively increase the potential on capacitor 24 with each cycle. These successive cycles of operation then assure that the potential to which the capacitor 24 is charged is substantially twice the source potential, 2E. Although such operation of the potential multiplier is preferred to achieve the highest possible output potential, it will be understood that the potential multiplier is operative to produce a somewhat lower final output potential with only one charging cycle for capacitor 24.

After the successive cycles of operation of the first potential multiplying circuit, the switching signals to control ports 10' and 14' change to enable gate 10 and disable gate 14, the switching signals to control ports 12', 16', and 18' remaining the same to keep gate 16 enabled and gates 12, 18 disabled. Enabled gates 10 and 16 then connect the capacitor 22 across capacitor 24 which has just been charged to twice the source potential, 2E. Capacitor 24 then charges capacitor 22 to the same, 2E, potential, the charge-limiting capacitance in the ratio of the capacitances of capacitors 22, 24 now being changed to permit charging of capacitor 22 to substantially the full 2E potential of capacitor 24. It will then also be understood that an alternative embodiment (not shown) in which the ratio of the capacitances of capacitors 22, 24 is inverted from that of the preferred embodiment may charge capacitor 22 from capacitor 24 in successive cycles, instead of charging capacitor 24 from capacitor 22 in successive cycles, in operation corollary to that before described.

With capacitors 22, 24 both at the potential 2E and the capacitor 26 at a potential somewhat less than 2E, the switching signals to the control ports 10', 16' change to disable the gates 10, 16, the switching signals to the control ports 12', 14' remaining the same to keep gates 12, 14 disabled. At the same time, the switching signal to the control port 18' changes to enable gate 18. With only gate 18 enabled, capacitors 22, 24 are connected in potential adding series between terminals 36 and 38. Since each capacitor 22, 24 was charged to twice the source potential, the output potential across the terminals 36, 38 is about four times the source potential, 4E. Capacitor 22 has thus now functioned in a second potential multiplying circuit which provides the approximate 4E potential to the terminals 36, 38. Since capacitor 22 earlier functioned in the first potential multiplying circuit, the capacitor has been timed shared between the first and second potential multiplying circuits.

As long as only gate 18 remains enabled, the 4E output potential could be tapped from terminals 36, 38. Once the charge on capacitors 22, 24 was depleted, however, the 4E output potential would not be again available until the gates again switched through the sequence just described. For this reason it is preferred to connect potential storing capacitor 26 and diode 20 in series across terminals 36, 38 and to tap the 4E output potential at output terminal 34 therebetween.

The potential storing capacitor 26 is thus likewise charged to a voltage of approximately 4E, there being a relatively small voltage drop across the diode 20. Capacitor 26 stores the 4E output potential, and the diode 20 which is connected between the output terminal 34 and the gate 16 and capacitor 22 prevents the higher potential on capacitor 26 from draining off back into the first and second potential multiplying circuits during their next sequence of operation. Since the embodiment shown in the drawing has a positive ground, it will be understood that the higher potential described for capacitor 26 is actually a more negative potential.

From the description of the preferred embodiment it is apparent that the gates 10, 12, 14, 16 and 18 operate merely as means for sequentially switching the capacitors 22, 24 within and between the first and second potential multiplying circuits. Therefore, the described gates may be replaced by any of the wide variety of known switch devices in alternative embodiments of the invention. For example, simple, well-known, manually operated single-pole, singlethrow switches could be used in place of the described gates. In such an embodiment, none of the described devices would, of course, be on an integrated circuit. It is also apparent from the description of the preferred embodiment that the capacitors function as potential storage devices. Other embodiments may then substitute other potential storage devices such as secondary cells or inductors for the described capacitors. Still another alternative embodiment may reverse the polarity of the output potential from that of the preferred embodiment by merely reversing the polarity of the ground and the orientation of the diode 20 from that shown in the drawing.

I claim:

1. A D.C. potential multiplier for multiplying the potential of a source comprising:
   a first potential multiplying circuit connected to the source for multiplying the potential of the source, the first potential multiplying circuit including only one first capacitor;
   a sequentially operated second potential multiplying circuit connected to the first potential multiplying circuit for multiplying the potential from the first potential multiplying circuit to provide an output potential from the potential multiplier, the second potential multiplying circuit including the first capacitor and only one other, second capacitor; and
   means for switchably connecting the first capacitor into the first and second potential multiplying circuits to time share the first capacitor between the potential multiplying circuits and provide substantially four times the potential of the source.

2. A D.C. potential multiplier for multiplying the potential of a source, the potential multiplier comprising:
   a first potential multiplying circuit having only one first capacitor, first switching means including means for connecting the first capacitor across the source for charging the first capacitor from the source, and means for connecting the first capacitor into potential adding series with the source; and
   a second potential multiplying circuit having only one other, second capacitor, second switching means including means for connecting the second capacitor across the first capacitor and the source to permit charging of the second capacitor toward the combined potential of the source and first capacitor, means for connecting the first capacitor across the second capacitor to permit charging of the first capacitor to the potential of the second capacitor, and means for connecting the first and second capacitors into potential adding series for providing an output potential which is the combination of the potentials then on the capacitors.

3. A D.C. potential multiplier as set forth in claim 2 which additionally comprises a third capacitor connected across the first and second capacitors and charged to the combined potential of the first and second capacitors.

4. A D.C. potential multiplier as set forth in claim 2 wherein each of the switching means comprise at least two gates formed on an integrated circuit.

5. A D.C. potential multiplier as set forth in claim 2 wherein the second switching means connects the second capacitor across the first capacitor and source with successive cycles of operation of the first potential multiplying circuit to permit charging of the second capacitor substantially to the combined potential of the source and first capacitor.

6. A D.C. potential multiplier for multiplying the potential of a source in an electronic device including an integrated circuit comprising:
   only two, first and second capacitors,
   first switching means formed on the integrated circuit for connecting the first capacitor across the source for charging the first capacitor,
   second switching means formed on the integrated circuit for connecting the first capacitor in potential adding series with the source and for connecting the second capacitor across the first capacitor and the source to charge the second capacitor toward the combined potential of the source and the first capacitor,
   a combination of the first and second switching means for connecting the first capacitor across the second capacitor for charging the first capacitor to the potential of the second capacitor, and
   third switching means formed on the integrated circuit for connecting the first and second capacitor in potential adding series to provide an output potential which is the sum of the potentials on the capacitors.

7. A D.C. potential multiplier as set forth in claim 6 which additionally comprises:
   a third capacitor; means on the integrated circuit for connecting the output potential to one side of the third capacitor; and a diode on the integrated circuit connected to the other side of the third capacitor for preventing the output potential from draining back into the potential multiplier.

* * * * *